(12) United States Patent
Altonen et al.

(10) Patent No.: US 7,670,039 B2
(45) Date of Patent: Mar. 2, 2010

(54) STATUS INDICATOR LENS AND LIGHT PIPE STRUCTURE FOR A DIMMER SWITCH

(75) Inventors: Gregory S. Altonen, Easton, PA (US); Eric Johnathan Mace, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 217 days.

(21) Appl. No.: 11/771,596

(22) Filed: Jun. 29, 2007

(65) Prior Publication Data

US 2008/0001549 A1  Jan. 3, 2008

Related U.S. Application Data

(63) Continuation-in-part of application No. 11/724,919, filed on Mar. 16, 2007.

(60) Provisional application No. 60/783,529, filed on Mar. 17, 2006.

(51) Int. Cl.
*H01H 9/18* (2006.01)
*F21V 8/00* (2006.01)

(52) U.S. Cl. .................... 362/555; 362/27; 362/85; 200/314

(58) Field of Classification Search ........... 362/555, 362/85, 95, 27, 558; 200/310–317, 330, 200/331
See application file for complete search history.

(56) References Cited

U.S. PATENT DOCUMENTS

| | | | |
|---|---|---|---|
| 3,377,452 A | 4/1968 | Willy et al | |
| 4,893,062 A | 1/1990 | D'Aleo et al. | |
| 4,947,054 A | 8/1990 | Flowers et al. | |
| 5,017,837 A | 5/1991 | Hanna et al. | |
| 5,030,893 A | 7/1991 | Spira et al. | |
| 5,248,919 A | 9/1993 | Hanna et al. | |

(Continued)

FOREIGN PATENT DOCUMENTS

WO  WO 2006/004879  1/2006

OTHER PUBLICATIONS

Leviton Manufacturing Co., Inc., Acenti Product Specifications, 2004, 12 pages.

(Continued)

*Primary Examiner*—Stephen F. Husar
*Assistant Examiner*—Peggy A. Neils
(74) *Attorney, Agent, or Firm*—Ostrolenk Faber LLP

(57) ABSTRACT

A light pipe structure for a dimmer switch comprises a continuous status indicator lens and a plurality of light pipes, which are operable to conduct the light from a plurality of discrete sources to the lens. The light conducted from one of the discrete sources through a light pipe generates a pinpoint of light on the front surface of the lens. The pinpoint of light is surrounded by a diffusion of light across the front surface of the lens, which produces an aesthetically-pleasing effect by increasing the uniformity of the illumination across the front surface of the status indicator lens. The light pipes are coupled to the lens via a plurality of rounds, which provide for diffusion of light around the pinpoint of light on the lens. The light pipes may comprise light-refracting structures, which the amount of light emitted from adjacent discrete sources from reaching the front surface of the lens.

17 Claims, 14 Drawing Sheets

U.S. PATENT DOCUMENTS

| | | | | |
|---|---|---|---|---|
| 5,252,798 | A | * | 10/1993 | Kamada .................... 200/314 |
| 5,349,504 | A | * | 9/1994 | Simms et al. ............... 362/555 |
| 5,399,940 | A | | 3/1995 | Hanna et al. |
| 5,430,356 | A | | 7/1995 | Ference et al. |
| 5,608,196 | A | | 3/1997 | Hall et al. |
| 5,637,930 | A | | 6/1997 | Rowen et al. |
| 5,736,965 | A | | 4/1998 | Mosebrook et al. |
| 5,905,442 | A | | 5/1999 | Mosebrook et al. |
| 5,909,087 | A | | 6/1999 | Bryde et al. |
| 5,982,103 | A | | 11/1999 | Mosebrook et al. |
| 5,988,842 | A | * | 11/1999 | Johnsen et al. ............. 362/551 |
| 6,011,883 | A | | 1/2000 | Davis et al. |
| 6,169,377 | B1 | | 1/2001 | Bryde et al. |
| 6,180,905 | B1 | * | 1/2001 | Pollock et al. ............. 200/527 |
| 6,210,010 | B1 | | 4/2001 | Pontetti et al. |
| 6,300,727 | B1 | | 10/2001 | Bryde et al. |
| 6,380,696 | B1 | | 4/2002 | Sembhi et al. |
| 6,443,582 | B1 | * | 9/2002 | Tarne et al. ................... 362/27 |
| 6,545,434 | B2 | | 4/2003 | Sembhi et al. |
| 6,727,446 | B1 | | 4/2004 | Mayo et al. |
| 6,734,381 | B2 | | 5/2004 | Mayo et al. |
| 6,798,341 | B1 | | 9/2004 | Eckel et al. |
| 6,803,728 | B2 | | 10/2004 | Balasubramaniam et al. |
| 7,126,070 | B2 | | 10/2006 | Endres et al. |
| 7,128,431 | B2 | * | 10/2006 | Ludewig et al. ............... 362/26 |
| 7,170,018 | B2 | | 1/2007 | Ilkhanov |
| 7,190,125 | B2 | | 3/2007 | McDonough et al. |
| 7,361,853 | B2 | | 4/2008 | Clegg et al. |
| 7,414,210 | B2 | | 8/2008 | Clegg et al. |
| 7,423,886 | B2 | * | 9/2008 | Nishimoto et al. .......... 361/807 |
| 7,432,460 | B2 | | 10/2008 | Clegg et al. |
| 7,432,463 | B2 | | 10/2008 | Clegg et al. |
| 2003/0089587 | A1 | | 5/2003 | Mayo et al. |
| 2004/0207343 | A1 | | 10/2004 | Novikov |
| 2005/0184677 | A1 | | 8/2005 | Johnsen et al. |
| 2005/0280598 | A1 | | 12/2005 | Webb et al. |
| 2006/0255959 | A1 | | 11/2006 | Salvestrini |
| 2006/0272569 | A1 | | 12/2006 | Lehmer et al. |
| 2006/0273970 | A1 | | 12/2006 | Mosebrook et al. |
| 2007/0193863 | A1 | * | 8/2007 | Wu ......................... 200/61.72 |
| 2007/0216318 | A1 | | 9/2007 | Altonen et al. |

OTHER PUBLICATIONS

Leviton Manufacturing Co., Inc., Acenti Installation Instructions, 2004, 2 pages.
Cooper Wiring Devices, Aspire Brochure, 2004, 12 pages.

* cited by examiner

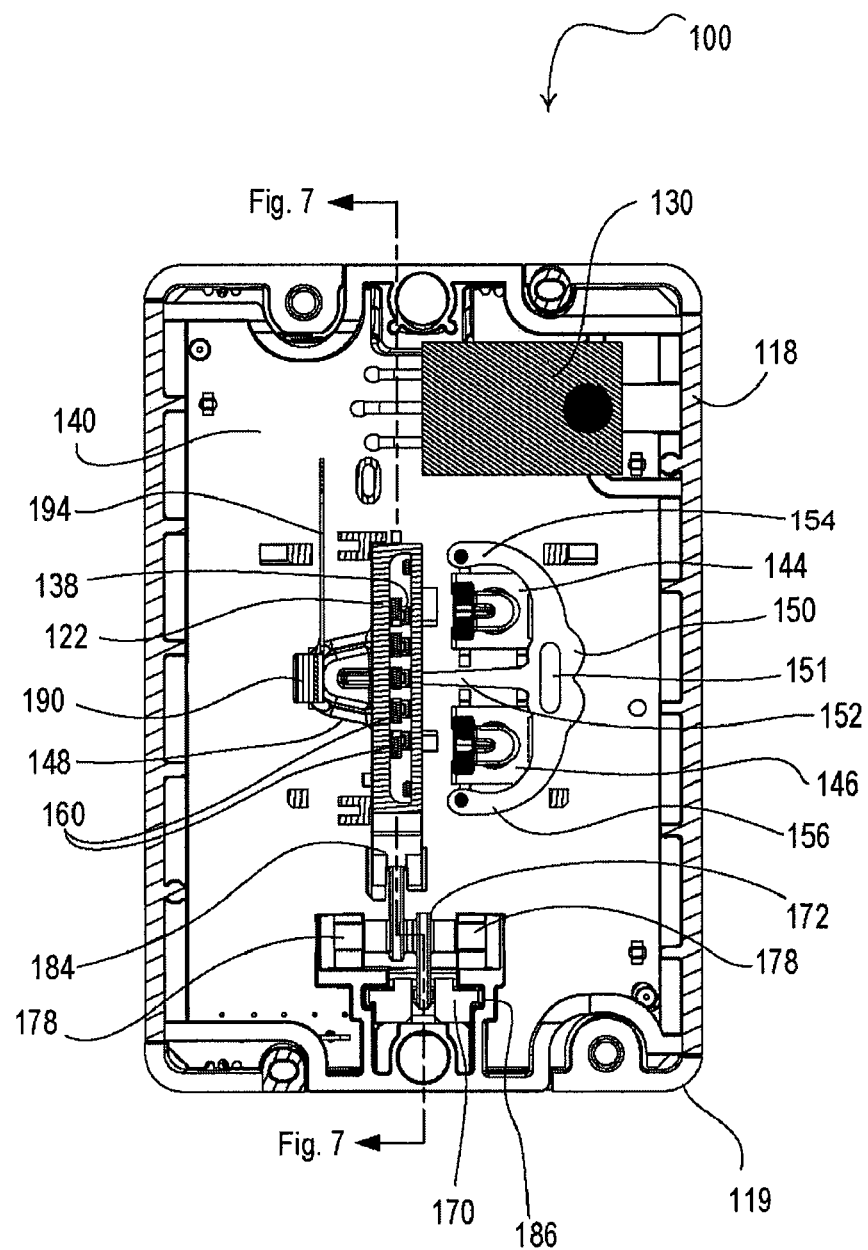
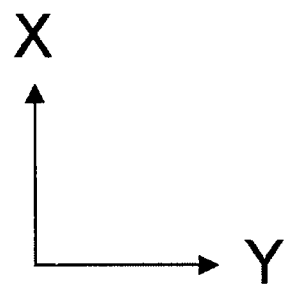
Fig. 6

STATUS INDICATOR LENS AND LIGHT PIPE STRUCTURE FOR A DIMMER SWITCH

RELATED APPLICATIONS

This application is a continuation-in-part of commonly-assigned U.S. patent application Ser. No. 11/724,919, filed Mar. 16, 2007, entitled TRADITIONAL-OPENING DIMMER SWITCH HAVING A MULTI-FUNCTIONAL BUTTON, which claims priority to commonly-assigned U.S. Provisional Application Ser. No. 60/783,529, filed Mar. 17, 2006, entitled LOAD CONTROL DEVICE HAVING A BUTTON WITH A LINEAR ARRAY OF STATUS INDICATORS. The entire disclosures of both applications are hereby incorporated by reference.

BACKGROUND OF THE INVENTION

1. Field of the Invention

The present invention relates to a load control device for controlling the intensity of a lighting load, specifically a traditional-opening dimmer switch having an elongated status indicator lens that illuminates to display a representation of the intensity of the lighting load when the load is on and a night light when the load is off.

2. Description of the Related Art

A conventional wall-mounted load control device is mounted to a standard electrical wallbox and is connected in series electrical connection with an electrical load. Standard load control devices, such as dimmer switches and motor speed controls, use one or more semiconductor switches, such as triacs or field effect transistors (FETs), to control the current delivered from an alternating-current (AC) power source to the load, and thus, the intensity of the lighting load or the speed of the motor.

Wall-mounted load control devices typically include a user interface having a means for adjusting the intensity or the speed of the load, such as a linear slider, a rotary knob, or a rocker switch. Some load control devices also include a button that allows for toggling of the load between off (i.e., no power is conducted to the load) and on (i.e., power is conducted to the load). It is often desirable to include a plurality of status indicators, such as light-emitting diodes (LEDs), on the user interface to indicate the intensity or speed of the load.

FIG. 1 shows the user interface of a prior art dimmer switch 10 having a plurality of status indicators 20. As shown, the dimmer switch 10 includes a faceplate 30 (i.e., a cover plate), a frame 32, an enclosure 34, a toggle button 40, and an intensity selection actuator 50 for selecting a desired level of light intensity of an associated lighting load controlled by the dimmer switch. The button 40 comprises an infrared (IR) lens 60 for receiving IR signals transmitted from an external IR transmitter (not shown) to control the intensity of the connected lighting load. The dimmer switch 10 further comprises an air-gap switch actuator 70 for actuating an air-gap switch inside the dimmer switch to provide an actual air-gap break in the electrical connection between the source and the load.

Pressing the button 40 causes the associated lighting load to toggle from on to off, or vice versa. Actuation of the upper portion of intensity selection actuator 50 increases or raises the light intensity of the lighting load, while actuation of the lower portion of actuator 50 decreases or lowers the light intensity. The intensity levels of the lighting load may range from a minimum intensity level, which is preferably the lowest visible intensity, but may be zero, or "full off," to a maximum intensity level, which is typically "full on." Light intensity level is typically expressed as a percent of full intensity. Thus, when the lighting load is on, the light intensity level may range from 1% to 100%.

The dimmer switch 10 also includes an intensity level indicator in the form of the plurality of status indicators 20 located on the frame 32. The status indicators 20 may be arranged in an array (such as a linear array as shown) representative of a range of light intensity levels of the lighting load being controlled. The linear array of status indicators 20 represents a linear scale (between off and full intensity of the associated lighting load), such that one of the status indicators is illuminated to indicate the intensity of the lighting load. For example, if the dimmer switch 10 is controlling the lighting load to 50%, the middle status indicator will be illuminated, since this status indicator is at the midpoint of the linear array of the status indicators 20.

Another example of a dimmer switch having a linear array of status indicators is described in commonly-assigned U.S. Pat. No. 5,248,919 (the "'919 patent"), issued Sep. 28, 1993, entitled LIGHTING CONTROL DEVICE, the entire disclosure of which is hereby incorporated by reference.

In order to keep the pressure required to actuate the toggle button less than the maximum comfortable pressure for a human finger, it is desirable to maximize the front surface area of the toggle button. Therefore, there is a need for a traditional-style dimmer switch that comprises a button having a maximum surface area, while still providing all of the functionality and features of the prior art dimmer switch 10, i.e., the toggle functionality of the toggle button 40, the air-gap actuator 70, and the linear array of status indicators 20.

SUMMARY OF THE INVENTION

According to the present invention, a light pipe structure for conducting light from a plurality of discrete sources comprises a plurality of light pipes and a continuous lens. Each of the light pipes has a first end adapted to be located adjacent one of the plurality of discrete sources and a second end. Each of the light pipes is operable to conduct the light of one of the discrete sources from the first end to the second end. The continuous lens has a front surface and a rear surface. The rear surface of the lens is coupled to the second end of each of the light pipes, such that the light conducted from one of the discrete sources through one of the light pipes generates a pinpoint of light on the front surface of the lens adjacent the second end of the one of the light pipes. The pinpoint of light is surrounded by a diffusion of light across the front surface of the lens. Preferably, the light pipe structure also comprises a plurality of rounds coupling the second ends of the light pipes to the rear surface of the lens to provide for the diffusion of light around the pinpoint of light on the front surface of the lens. Further, the light pipe structure may comprise a light-refracting structure formed in one of the light pipes, where the light-refracting structure is adapted to minimize the amount of light that is emitted from the discrete sources that are not located adjacent the first end of the light pipe from reaching the front surface of the lens.

In addition, the present invention provides a load control device for controlling the amount of power delivered to an electrical load from an AC power source. The load control device comprises a control actuator adapted to be provided in an opening of a faceplate, and a status indicator lens provided at a front surface of the actuator. The status indicator lens is operable to display a representation of the amount of power being delivered to the electrical load by illuminating a point on the status indicator lens, the point surrounded by a diffusion of light across the status indicator lens.

Other features and advantages of the present invention will become apparent from the following description of the invention that refers to the accompanying drawings.

BRIEF DESCRIPTION OF THE DRAWINGS

FIG. 6 is a front cross-sectional view of the dimmer switch of FIG. 2;

DETAILED DESCRIPTION OF THE INVENTION

Figure 1:
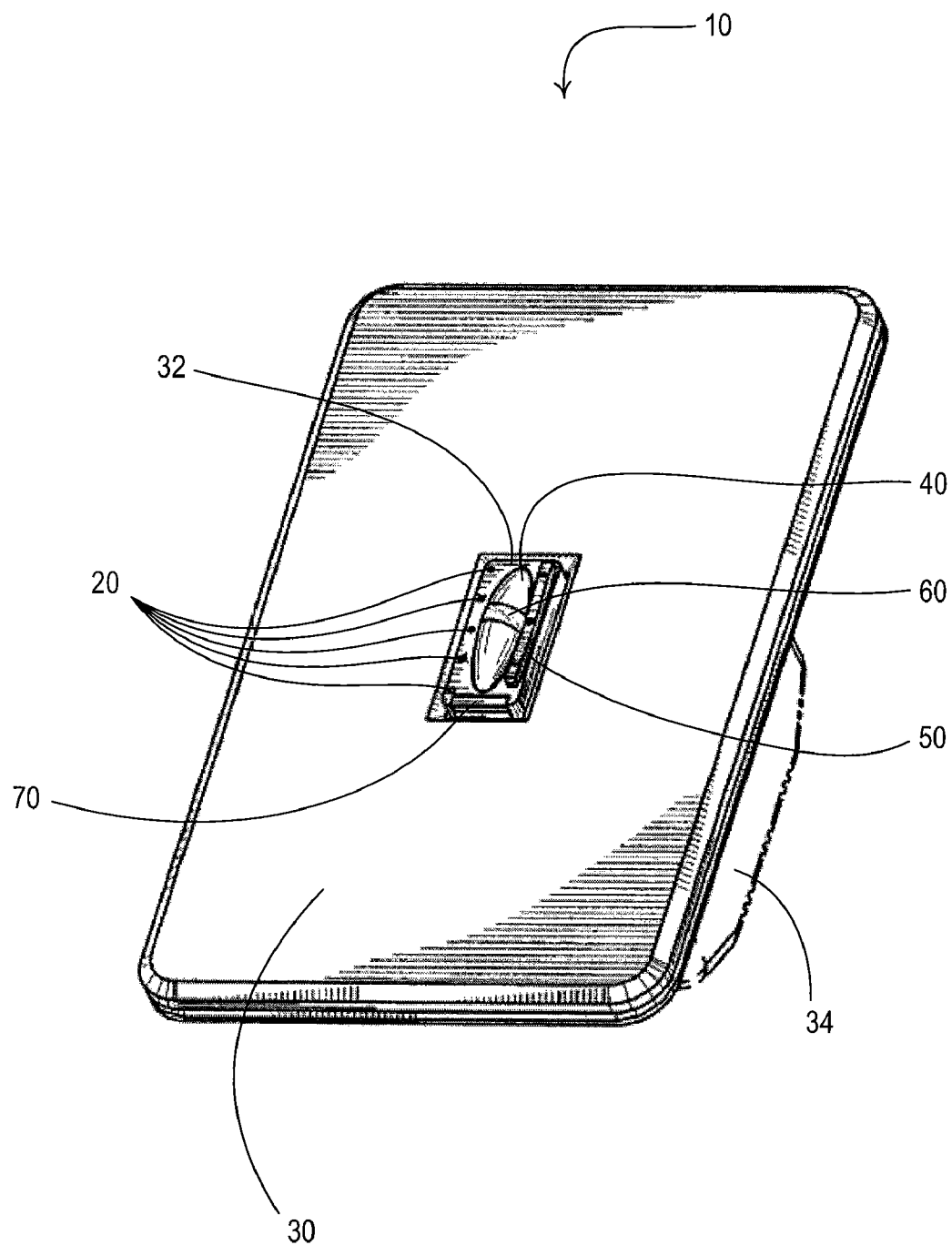
FIG. 1 shows the user interface of a prior art dimmer switch having a plurality of status indicators.

The foregoing summary, as well as the following detailed description of the preferred embodiments, is better understood when read in conjunction with the appended drawings. For the purpose of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
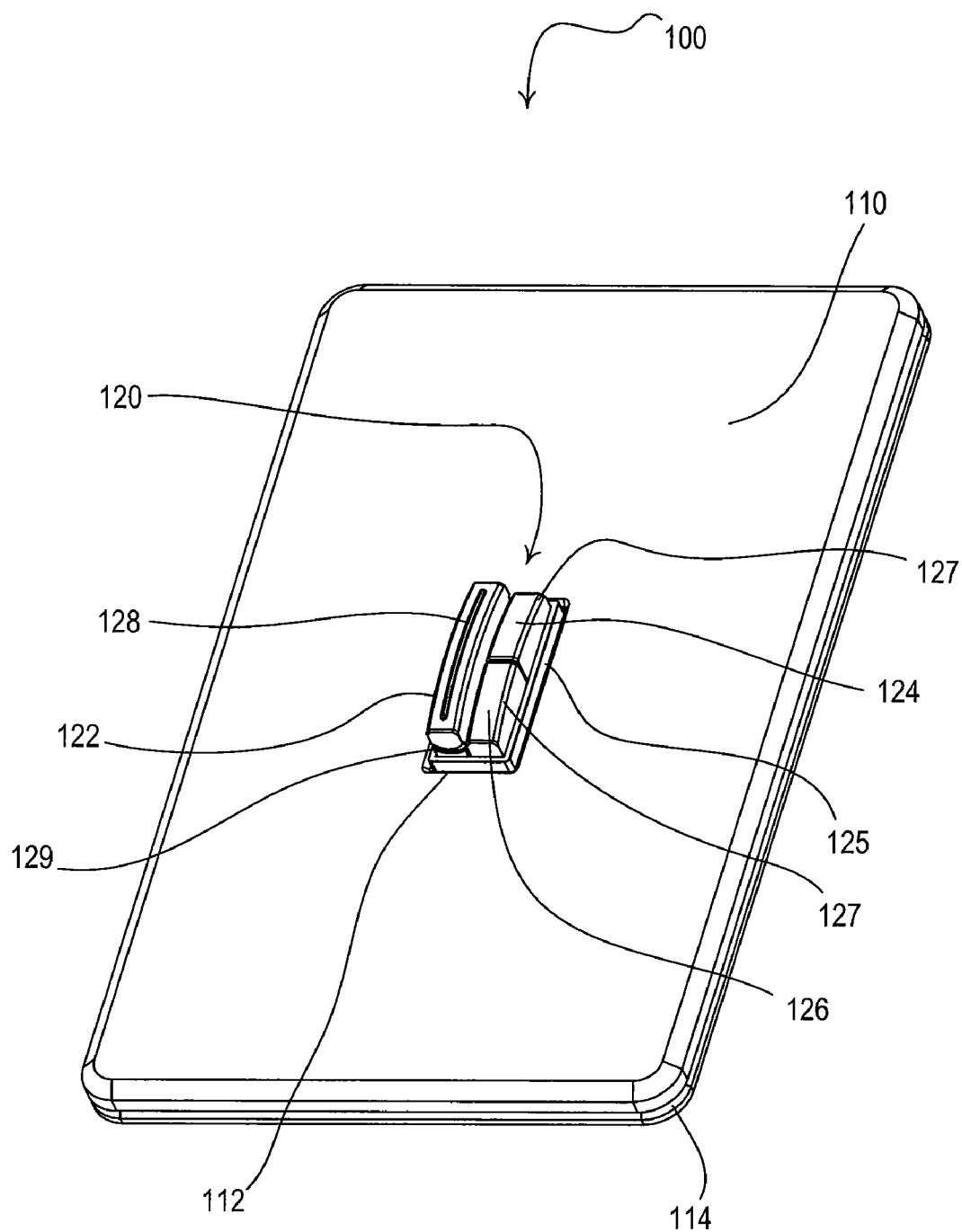
FIG. 2 is a perspective view of a dimmer switch according to a first embodiment of the present invention.
Figure 3:
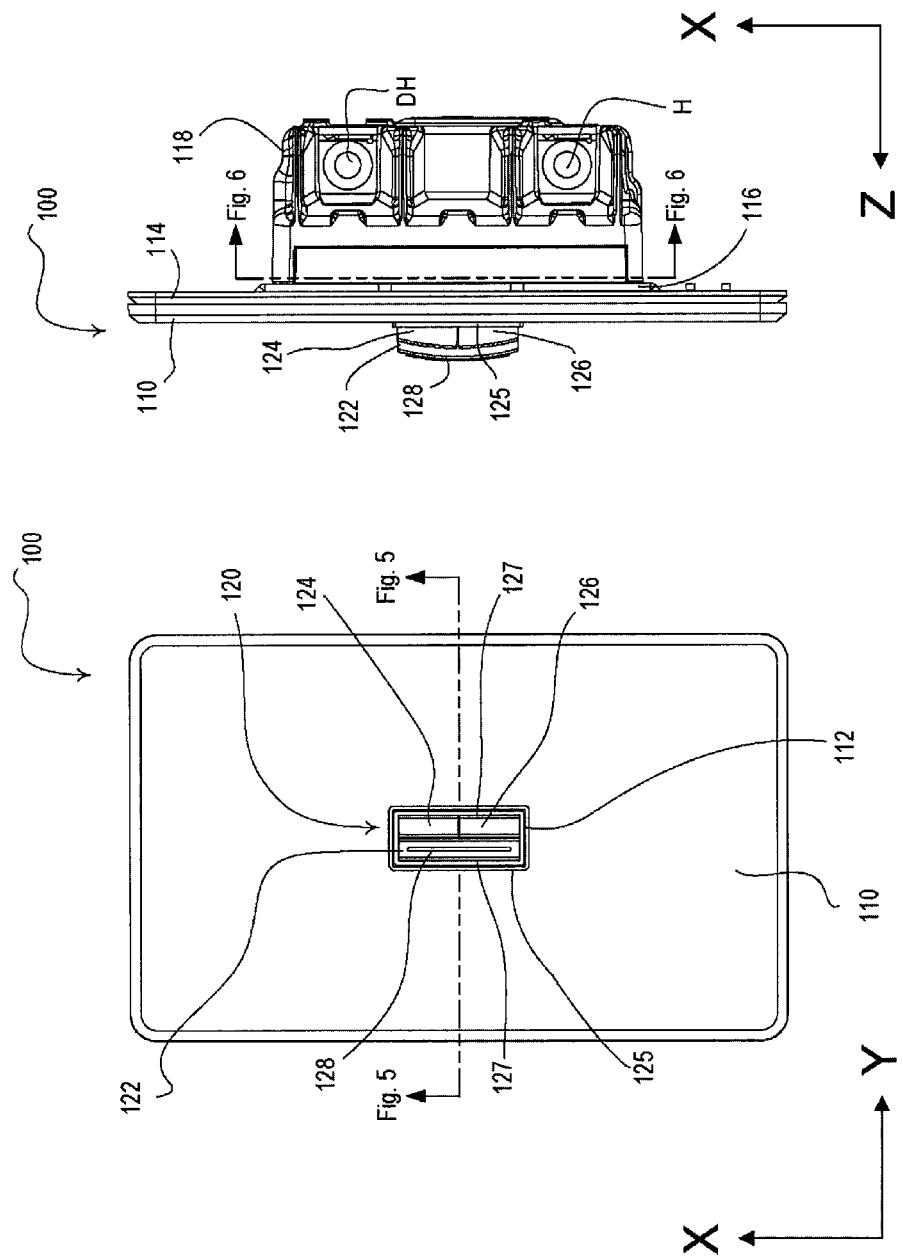
FIGS. 3A and 3B are front and right-side views, respectively, of the dimmer switch of FIG. 2.
Figure 5:
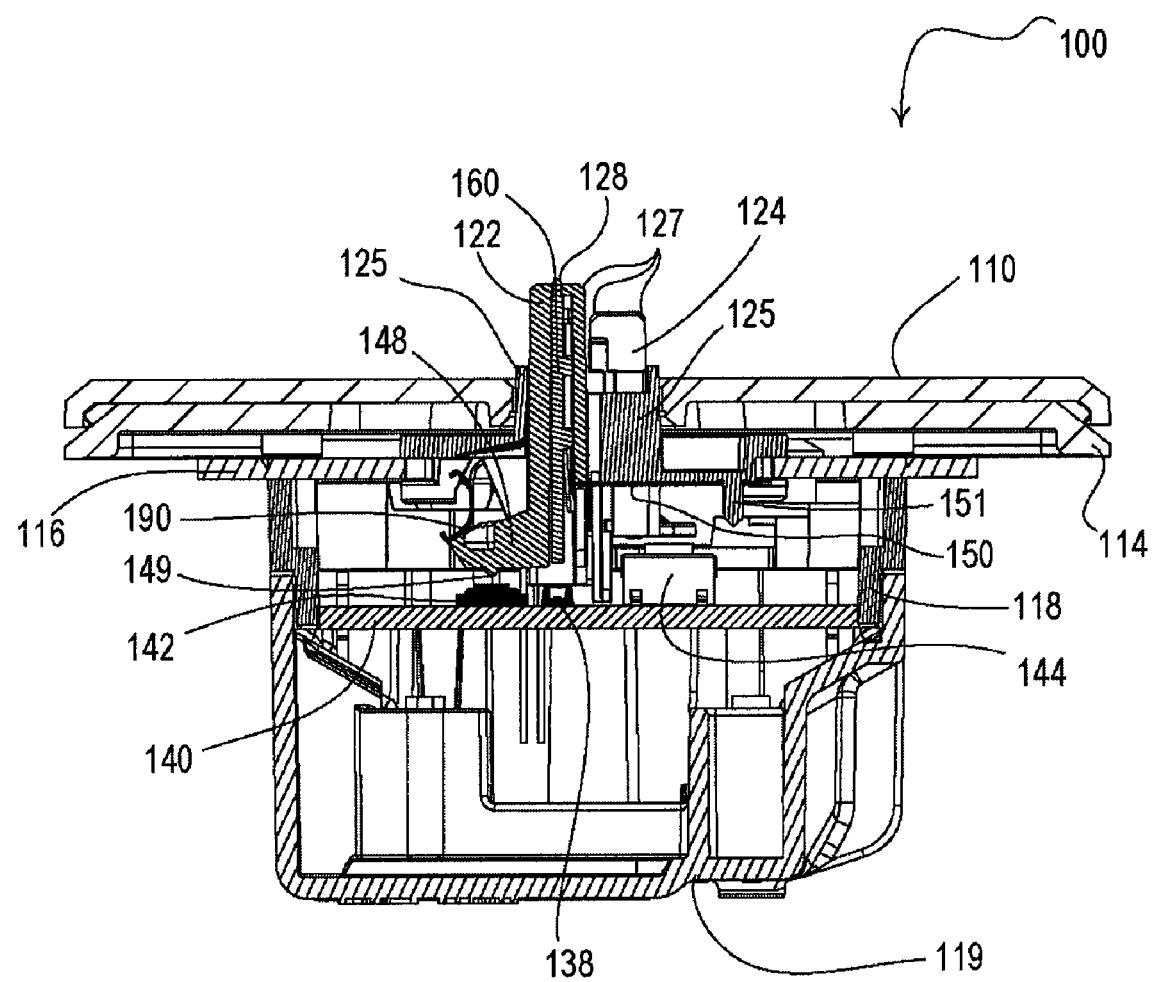
FIG. 5 is a bottom cross-sectional view of the dimmer switch of FIG. 2.

FIG. 2 is a perspective view of a dimmer switch 100 according to a first embodiment of the present invention. FIG. 3A is a front view and FIG. 3B is a right-side view of the dimmer switch 100. The dimmer switch 100 comprises a faceplate 110 (i.e., a cover plate) having a traditional-style opening 112. Per the standards set by the National Electrical Manufacturers Association (NEMA), the traditional-style opening 112 has a length in the longitudinal direction (i.e., in the direction of the X-axis as shown in FIG. 3A) of 0.925" and a width in the lateral direction (i.e. in the direction of the Y-axis) of 0.401" (NEMA Standards Publication No. WD6, 2001, p. 7). The faceplate 110 is connected to an adapter 114, which is attached to a yoke 116. The yoke allows the dimmer switch 100 to be mounted to a standard electrical wall-box (not shown). The electrical circuitry of the dimmer switch 100, which will be described in greater detail below, is housed in a back enclosure, which comprises a ring portion 118 and a back cover portion 119 (FIG. 5).

The dimmer switch 100 comprises a user interface 120 having three depressible rectangular actuators: a control actuator 122 (i.e. a control button), a raise actuator 124 (i.e., a power-increase button), and a lower actuator 126 (i.e., a power-decrease button). The front surface of the control actuator 122 has a positive curvature, while the front surfaces of the raise actuator 124 and the lower actuator 126 appear to form a single continuous surface having a positive curvature above the plane of the faceplate 110 as shown in FIG. 3B. The control actuator 122, raise actuator 124, and lower actuator 126 have length-wise edges 127 that are chamfered.

The dimmer switch 100 further comprises a support frame 125. The support frame 125 defines a thin shroud surrounding the control actuator 122, the raise actuator 124, and the lower actuator 126. The thin shroud of the frame 125 prevents the buttons from binding with the edges of the opening 112 of the faceplate 110 due to a planar displacement of the faceplate relative to the frame.

Figure 4:
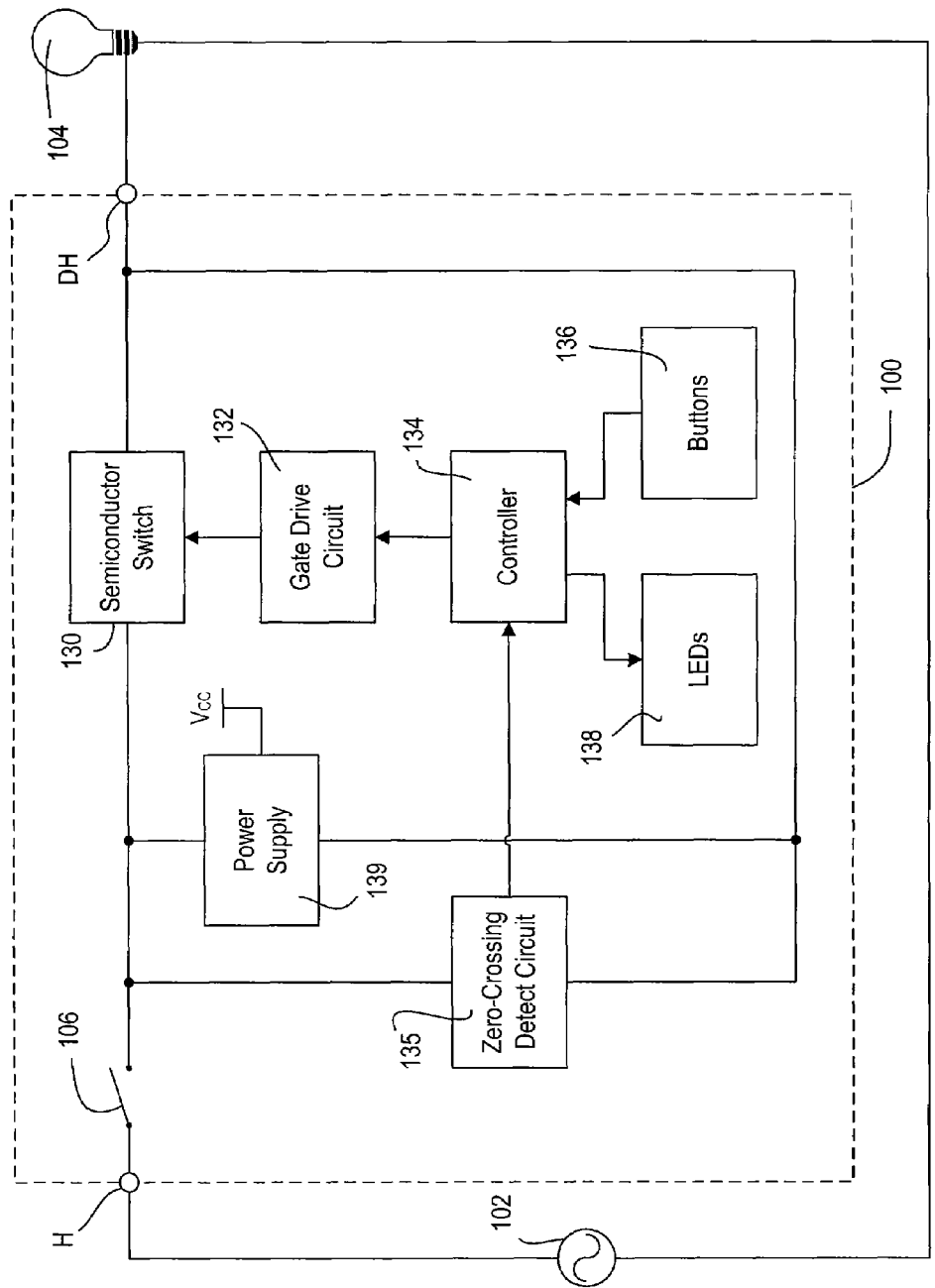
FIG. 4 is a simplified block diagram of the dimmer switch of FIG. 2.

In response to transitory actuations of the control actuator 122 (i.e., comprising a press and a release of the control actuator), the dimmer switch 100 is operable to provide a first functionality. Specifically, actuations of the control actuator 122 cause the dimmer switch 100 to toggle, i.e., turn off and on, a connected electrical load, for example, a lighting load 104 (FIG. 4). Further, actuations of the raise actuator and the lower actuator cause the dimmer switch 100 to raise and lower the intensity of the connected lighting load, respectively. The functionality of the dimmer switch 100 in response to transitory actuations of the control actuator 122, the raise button 124, and the lower button 126 is described in greater detail in the '919 patent.

The control actuator 122 is further operable to provide a second functionality to actuate (i.e., open) an air-gap switch 106 (FIG. 4) inside the back enclosure of the dimmer switch 100. A user is able to pull the control actuator 122 outwards from the dimmer switch 100 (i.e., away from the front surface of the faceplate 110) in order to actuate the air-gap switch 106. The control actuator 122 is provided with fingernail grooves 129 on the top and bottom surfaces to allow the user to grasp and pull out the control actuator. The control actuator 122 is maintained in a pulled-out state while the air-gap switch 106 is open. The user is able to push the control actuator 122 back in towards the dimmer switch 100 to once again close the air-gap switch 106.

The dimmer switch 100 further comprises a status indicator lens 128 on the control actuator 122. The status indicator lens 128 comprises a continuous front surface for providing a visual display in the form of a linear illumination array of status indicators on the front surface of the control actuator 122. The status indicator lens 128 is substantially transparent such that the lens is operable to transmit the light from a plurality of discrete light sources inside the dimmer switch 100 to the front surface of the control actuator 122. The discrete light sources preferably comprise light-emitting diodes (LEDs) 138 (FIG. 4). One or more of the individual LEDs 138 illuminates to indicate the intensity level of the connected lighting load, which is described in greater detail in the '919 patent. Alternatively, the dimmer 100 may comprise a plurality of status indicator lenses on the front surface of the control actuator 122, for example, one status indicator lens for each LED 138.

FIG. 4 is a simplified block diagram of the dimmer switch 100 of the present invention. The dimmer switch 100 has a hot terminal H connectable to an AC power source 102 and a dimmed hot terminal DH connectable to an electrical load, such as a lighting load 104 or a motor load. The dimmer switch 100 employs a controllably conductive device, e.g., a bidirectional semiconductor switch 130, coupled between the hot terminal H and the dimmed hot terminal DH to control the current through, and thus the intensity of, the lighting load 204. The semiconductor switch 130 has a control input (or gate), which is connected to an output of a gate drive circuit 132. A control signal applied to the input to the gate will render the semiconductor switch 130 conductive or non-conductive, which in turn controls the power supplied to the lighting load 104. The semiconductor switch 130 may comprise a triac, a field effect transistor (FET) or an insulated gate bipolar transistor (IGBT) in a full-wave rectifier bridge, two FETs or two IGBTs in anti-series connection, or any other suitable type of bidirectional semiconductor switch.

The gate drive circuit 132 provides control inputs to the semiconductor switch 130 in response to command signals from a controller 134. The controller 134 is preferably implemented as a microprocessor, but may be any suitable controller, such as a programmable logic device (PLD), a microcontroller, or an application specific integrated circuit (ASIC). A zero-crossing detect circuit 135 determines the zero-crossing points of the AC source voltage from the AC power supply 102. A zero-crossing is defined as the time at which the AC supply voltage transitions from positive to negative polarity, or from negative to positive polarity, at the beginning of each half-cycle. The zero-crossing information is provided as an input to the controller 134. The controller 134 generates the gate control signals to operate the semiconductor switch 130 to thus provide voltage from the AC power supply 102 to the lighting load 104 at predetermined times relative to the zero-crossing points of the AC waveform. The dimmer switch 100 further comprises a power supply 139 to generate a direct-current (DC) voltage $V_{CC}$ to power the controller 134.

The controller 134 receives user inputs from a plurality of buttons 136, e.g., the control actuator 122, the raise actuator 124, and the lower actuator 126 of the user interface 120 of the dimmer switch 100. The controller 134 is operable to control the semiconductor switch 130 to provide a desired intensity of the lighting load 104 in response to the inputs received from the buttons 136. The controller 134 generates command signals to drive the LEDs 138, and thus, the linear array of status indicators at the front surface of the control actuator 122, i.e., on the status indicator lens 128. The controller 134 illuminates one or more of the LEDs 138 to indicate the desired intensity of the lighting load 104.

The air-gap switch 106 is coupled in series between the hot terminal H and the semiconductor switch 130. The air-gap switch 106 has a normally-closed state in which the semiconductor switch 130 is coupled in series electrical connection between the AC power source 102 and the electrical load 104. When the air-gap switch 106 is actuated (i.e., in an open state), the air-gap switch provides an actual air-gap break between the AC power source 102 and the electrical load 104. The air-gap switch 106 allows a user to service the lighting load 104 without the risk of electrical shock.

Figure 7:
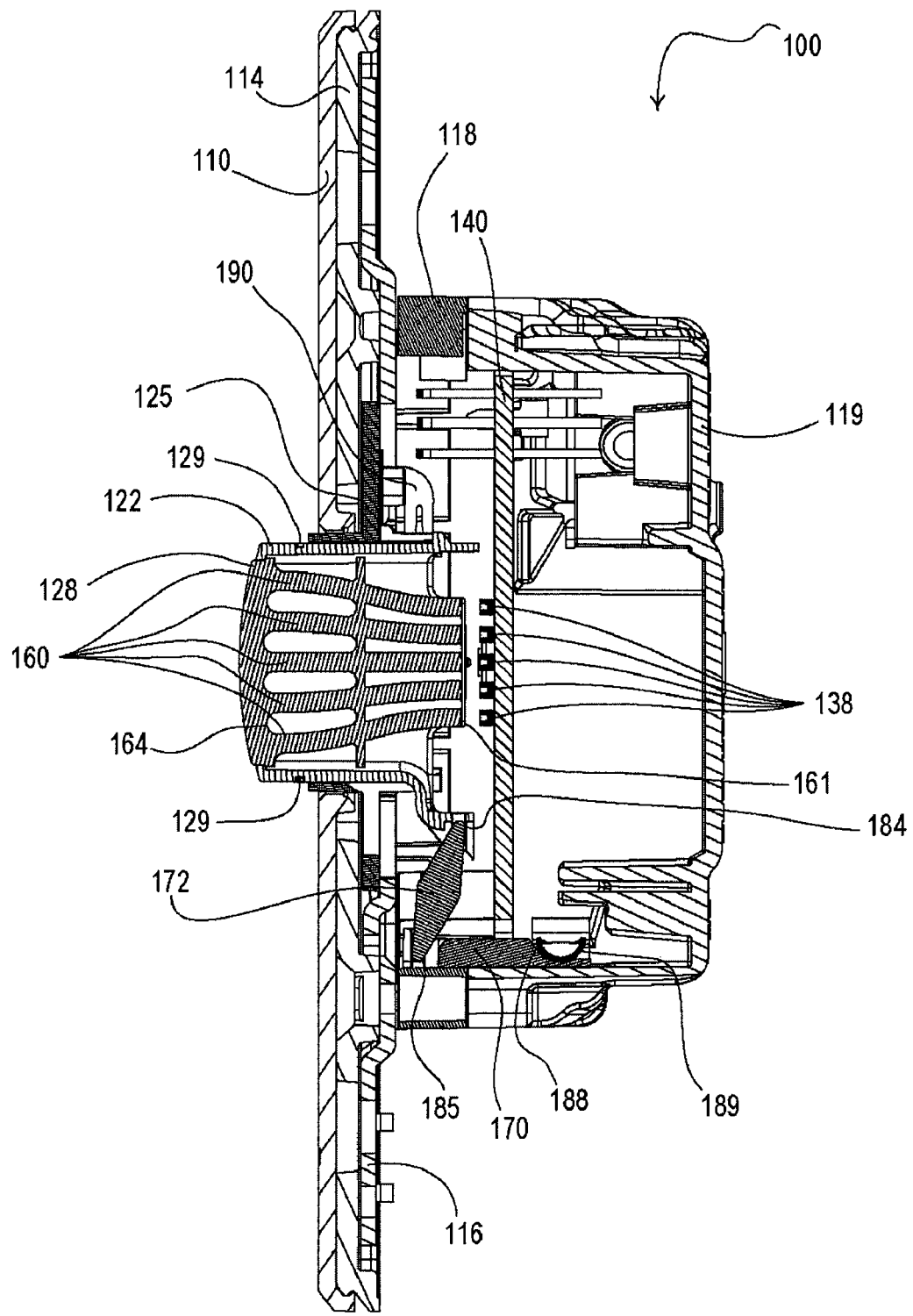
FIG. 7 is a right-side cross-sectional view of the dimmer switch of FIG. 2.

FIG. 5 is a bottom cross-sectional view, FIG. 6 is a front cross-sectional view, and FIG. 7 is a right-side cross-sectional view of the dimmer switch 100. As shown in FIGS. 5 and 7, the control actuator 122, the raise button 124, (and the lower button 126) extend through the frame 125 beyond the front surface of the faceplate 110. The control actuator 122 is operable to move towards and away from the front surface of the faceplate 110 along a first axis of travel. The electrical circuitry of the dimmer switch 100 (i.e., the semiconductor switch 130, the gate drive circuit 132, the controller 134, the zero-crossing detect circuit 135, the buttons 136, the LEDs 138, and the power supply 139) is coupled to a printed circuit board (PCB) 140, which is mounted in the back enclosure of the dimmer switch 100. The LEDs 138 (e.g., five LEDs) are mounted to the PCB 140 in a linear array directly below the control actuator 122, such that the LEDs are operable to illuminate the status indicator lens 128. The LEDs 138 may be, for example, part number TLMG2100GS08 manufactured by Vishay Intertechnology, Inc.

The buttons 136 comprise a control tactile switch 142, a raise tactile switch 144, and a lower tactile switch 146, which are actuated by the control actuator 122, the raise actuator 124, and the lower actuator 126, respectively. The control actuator 122 comprises an extension 148 having an actuator knob 149 for contacting the control tactile switch 142. Accordingly, the control tactile switch 142 is located at a lateral distance from the axis of movement (i.e., the center) of the control actuator 122, such that the LEDs 138 can be mounted directly behind the control actuator 122. Only a low-force actuation is required to displace the control actuator 122 a short distance to actuate the control tactile switch 142.

A button return spring 150 is mounted to the rear side of the frame 125 and is ultrasonically-staked or heat-staked to the frame via a post 151. The button return spring 150 comprises a first leg 152, a second leg 154, and a third leg 156, for causing the control actuator 122, the raise button 124, and the lower button 126, respectively, to return to the normal state after a transitory actuation of any of the buttons. For example, the first leg 152 of the button return spring 150 contacts a notch 159 (FIG. 9B) in the control actuator 122.

Figure 8:
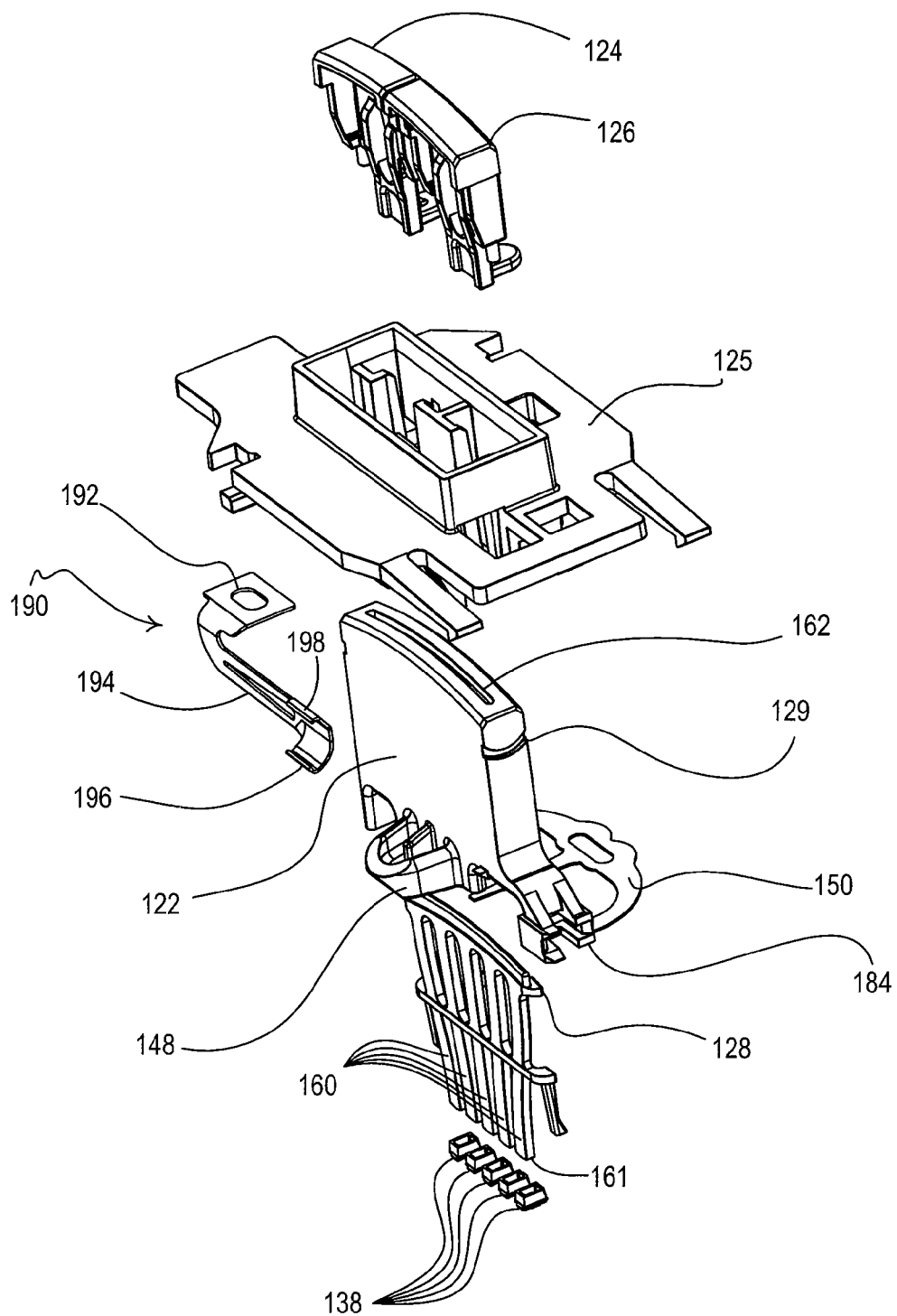
FIG. 8 is an exploded view of the assembly of a control button and a status indicator lens of the dimmer switch of FIG. 2.

FIG. 8 is an exploded view of the assembly of the control actuator 122, the raise button 124, the lower button 126, and the status indicator lens 128. A light pipe structure, i.e., the status indicator lens 128 and a plurality of light pipes 160, is received within the control actuator 122. For example, there are five light pipes 160 as shown in FIGS. 5-8, such that there is one light pipe for each of the LEDs 138. Each one of the LEDs 138 is mounted adjacent a first end 161 of one of the light pipes 160. The light pipes 160 extend through the control actuator 122 and have second ends that are connected to the status indicator lens 128. The status indicator lens 128 protrudes through an elongated opening 162 in the front surface of the control actuator. The light pipes 160 conduct the light emitted by the LEDs 138 to the front surface of the control actuator 122. The light pipes 160 are designed such that there is little or no bleeding of the light between the light pipes. For example, if the fourth LED 138 is illuminated, the light shines through the fourth light pipe 160 to illuminate a portion of the front surface of the status indicator lens 128 above the fourth light pipe.

Figure 11:
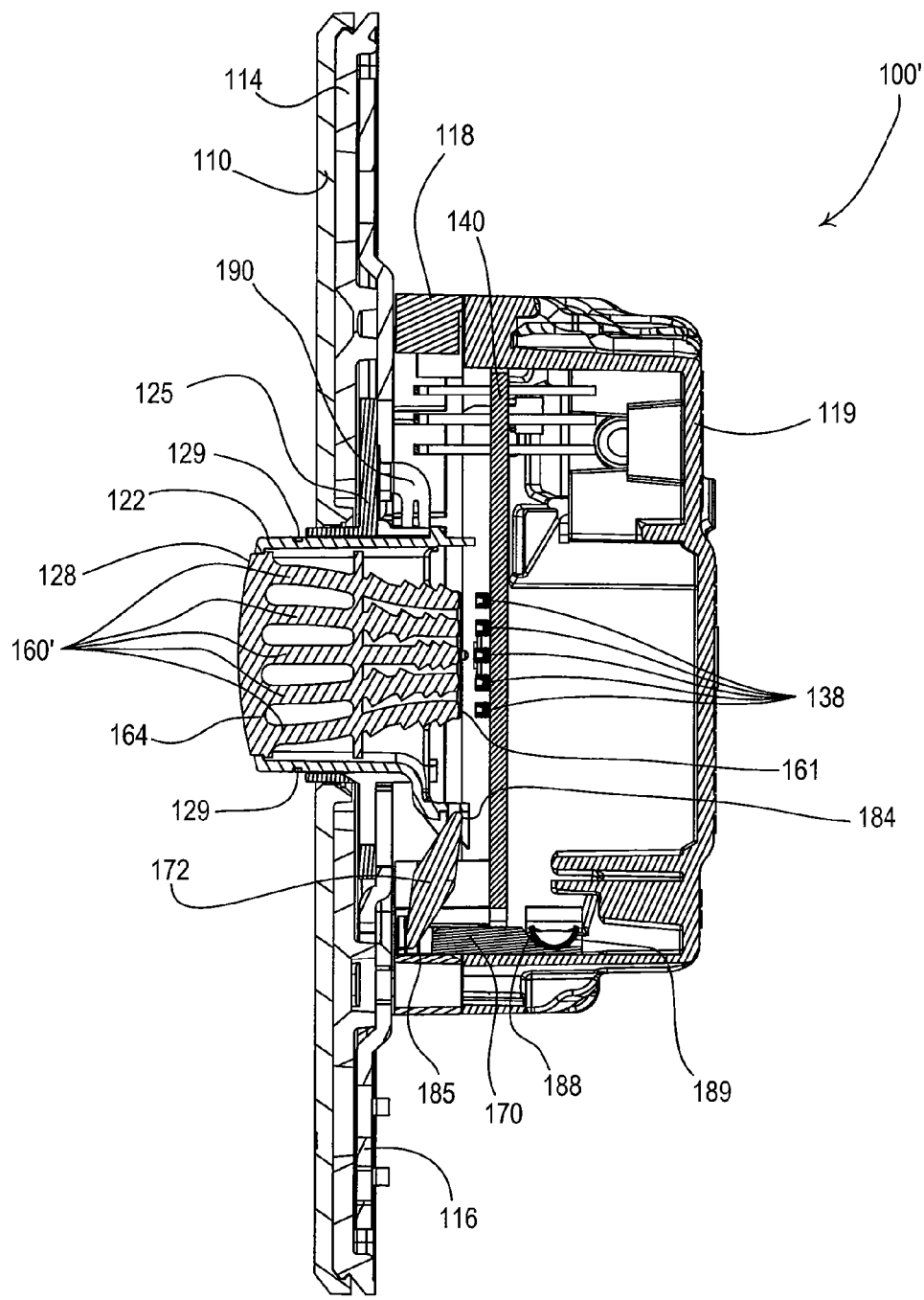
FIG. 11 is a right-side cross-sectional view of a dimmer switch according to a second embodiment of the present invention.
Figure 12:
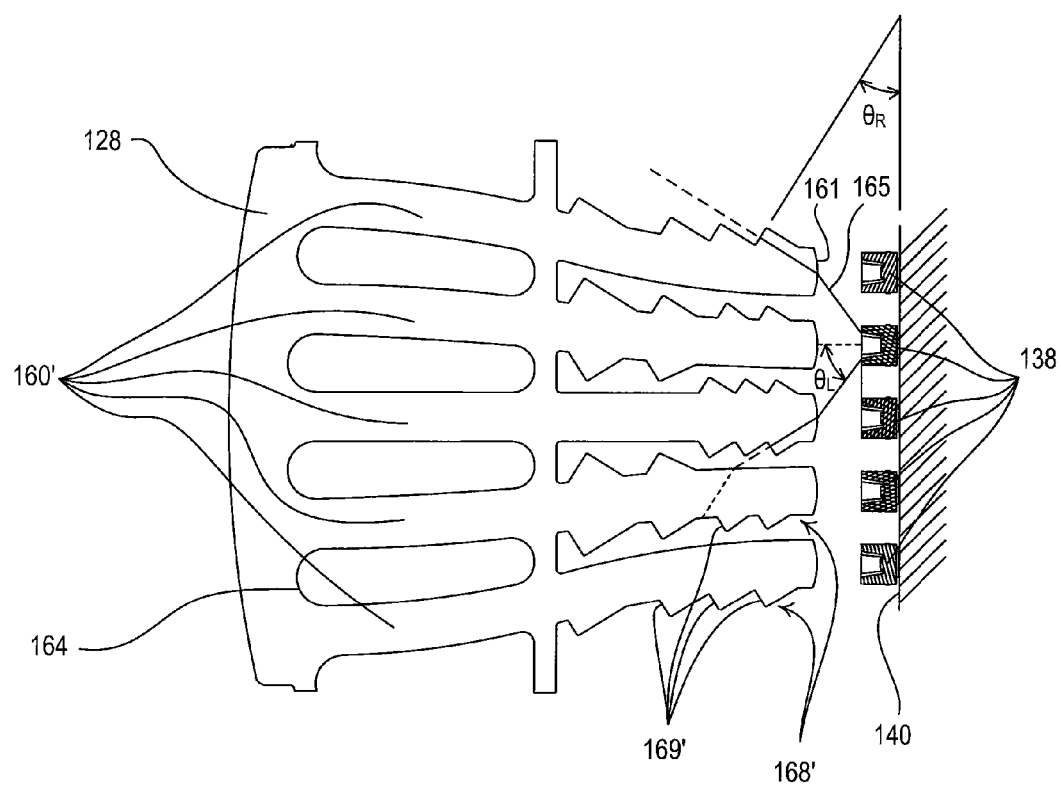
FIG. 12 is an enlarged right-side view of a plurality of light pipes 160' of the dimmer switch of FIG. 11.

Preferably, the tops of the light pipes 160 merge with one another at a rear surface of the status indicator lens 128 over concave curvatures, e.g., rounds 164 (FIGS. 7, 11 and 12). As a result, the light conducted by each of the light pipes 160 is diffused slightly across the front surface of the status indicator lens 128, which produces an aesthetically-pleasing effect by increasing the uniformity of the illumination across the front surface of the status indicator lens 128. The rounds 164 preferably have a radius of 0.038". When one of the LEDs 138 is illuminated, the status indicator lens 128 displays a pin-point of illumination above the light pipe 160 of the illuminated LED surrounded by an area having gradually decreasing illumination. Preferably, the cross-sectional areas of the light pipes 160 increase from the base of the light pipes to the status indicator lens 128, such that the light pipes have dimensions of 0.065" by 0.030" near the base and 0.067" by 0.030" near the status indicator lens.

Figure 9A:
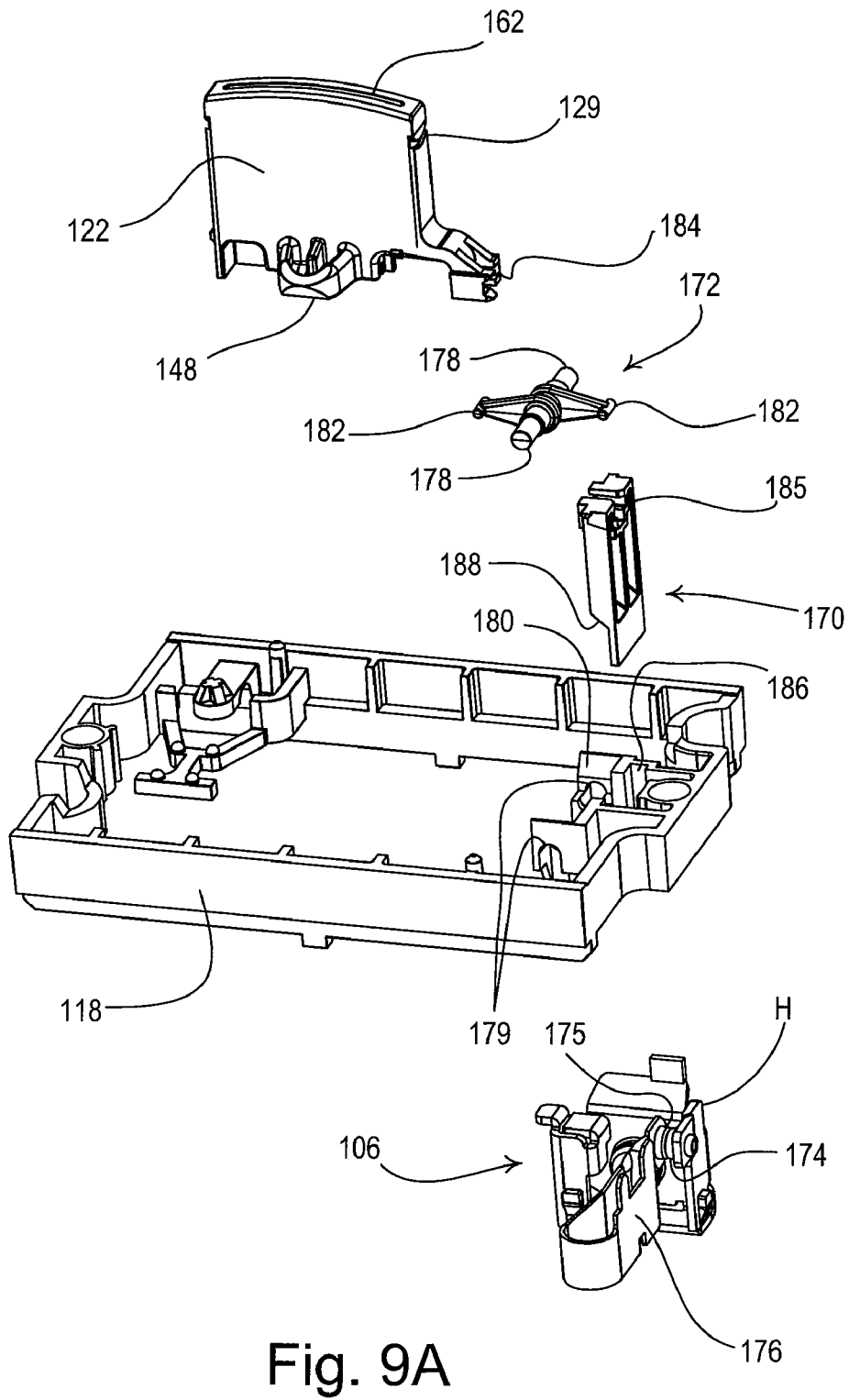
FIGS. 9A and 9B are first and second exploded views of the air-gap actuator assembly of the dimmer switch of FIG. 2.
Figure 9B:
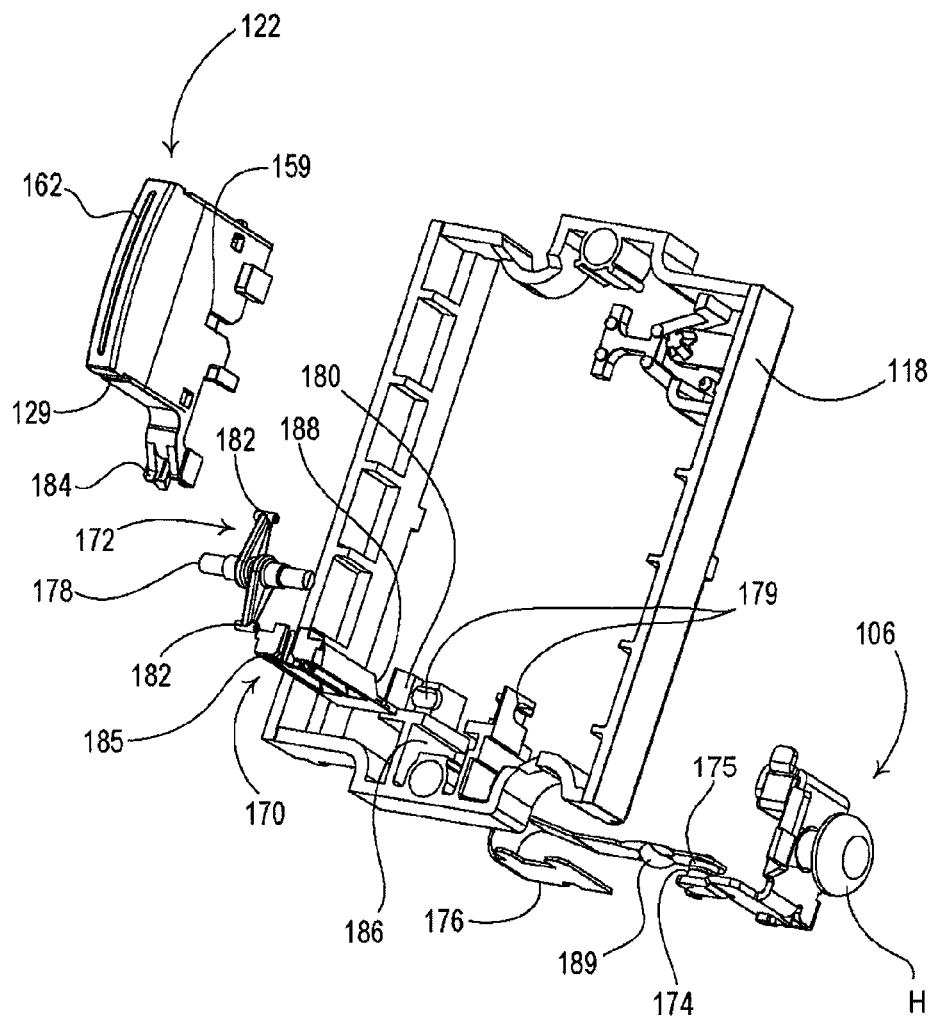

FIGS. 9A and 9B are first and second exploded views of the air-gap actuator assembly of the dimmer switch 100. The control actuator 122 is mechanically coupled to an air-gap shaft 170 (i.e., a cam) via an air-gap lever 172. The air-gap switch 106 includes a first electrical contact 174 connected to the hot terminal H and a second electrical contact 175 connected to a switch leaf 176. The switch leaf 176 is connected to the PCB 140 to allow the semiconductor switch 130 to be coupled to the AC power source 102. The electrical contacts 174, 175 of the air-gap switch 106 are normally closed, such that the dimmer switch 100 is electrically coupled between the AC power source 102 and the electrical load 104 in a normal state.

The lever 172 includes posts 178, which are rotatably coupled to lever supports 179 on the ring portion 118 of the back enclosure. The ring portion 118 includes beveled edges 180, which allow the posts 178 to be snapped into the lever supports 179 during manufacturing of the dimmer switch 100. The lever 172 also includes cylindrical ends 182, which are slidingly received by a first attachment portion 184 on the control actuator 122 and a second attachment portion 185 on the shaft 172. The shaft 172 slides through a channel 186 in the ring portion 118 along a second axis of travel, which is offset in an orthogonal direction from the first axis of travel of the control actuator 122. Specifically, the second axis of travel is parallel to the first axis of travel and offset in both a lateral direction and a longitudinal direction.

When the air-gap switch 106 is closed and the electrical contacts 174, 175 are connected, the control actuator 122 is in a normal position (as shown in FIGS. 5-7). When the control actuator 122 is pulled out away from the front surface of the dimmer switch 100 (into an air-gap open state), the lever 172 operates to push the shaft 170 towards the air-gap switch. Specifically, a contact portion 188 of the shaft 170 contacts a bump 189 on the air-gap switch 106 near the second electrical contact 175. Accordingly, the second electrical contact 175 is moved away from the first electrical contact 174, thereby breaking the electrical connection and providing an air-gap break between the AC power source 102 and the electrical load 104.

A detent spring 190 (FIGS. 5, 6 and 8) is provided to hold the control actuator 122 in either the normal state or the air-gap open state. The detent spring 190 is connected to the frame 125, e.g., an opening 192 in the detent spring is ultrasonically-staked or heat-staked to a post (not shown) on the rear side of the frame. An arm 194 of the detent spring 190 extends from the opening 192 to a lower contact portion 196 and an upper contact portion 198.

While the air-gap switch 106 is closed, the lower contact portion 196 of the detent spring 190 contacts the upper surface of the extension 148 of the control actuator 122 to hold the control actuator in the normal state. When the control actuator 122 is pulled out from the dimmer switch 100, the arm 194 of the detent spring 190 flexes away from the control actuator 122, i.e., towards the left as shown in FIG. 5. After the extension 148 of the control actuator 122 moves past the detent spring 190, the arm 194 forces the detent spring back towards the control actuator. The upper contact portion 198 contacts the lower surface of the extension 148 such that the control actuator 122 is held in the air-gap open state. Thus, an actuation of the control actuator 122 to actuate the air-gap switch 106 (i.e., pulling the control actuator away from the dimmer switch 100) requires a greater force and a greater displacement of the control actuator than the transitory actuation of the control actuator 122 to control the lighting load 104.

The light pipes 160 of the dimmer 100 according to the first embodiment of the present invention allow the light conducted by each of the light pipes 160 to be diffused slightly across the front surface of the status indicator lens 128, such that the status indicator lens displays a pinpoint of illumination above the light pipe 160 of the illuminated LED 138. However, the light from a single LED 138 under one of the light pipes 160 may also shine into one or both of the adjacent light pipes. The light from the single LED 138 may be reflected off the sides of the adjacent light pipes 160, such that the light from the single LED produces additional pinpoints of light on the front surface of the status indicator lens 128, particularly when viewed from an off-angle, i.e., from above or below the dimmer switch 100.

Figure 10A:
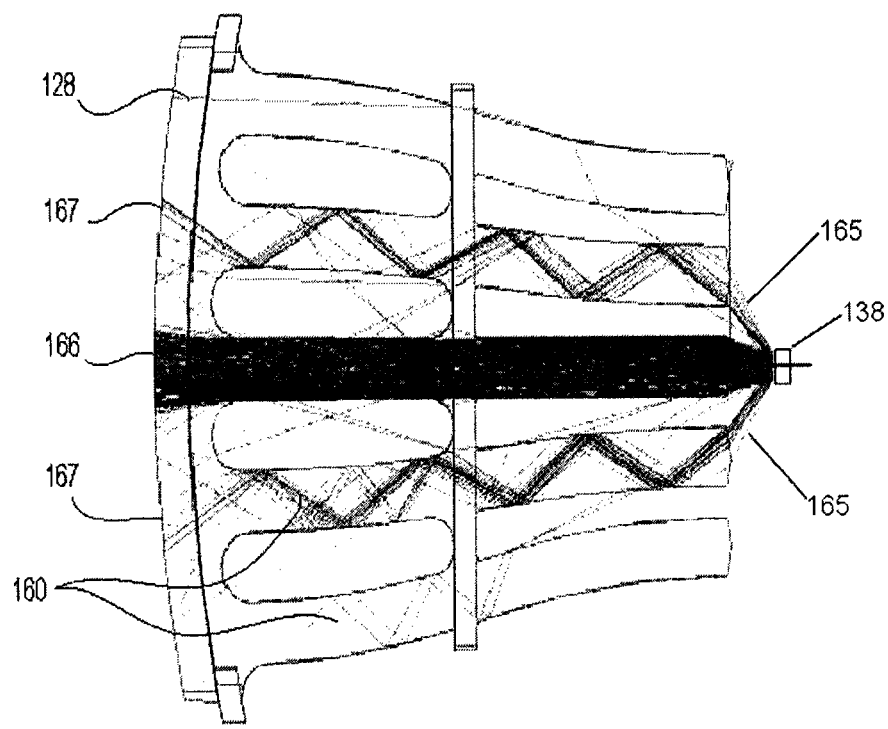
FIG. 10A is a side view of the status indicator lens and a plurality of light pipes of the dimmer switch of FIG. 2 demonstrating the conduction of light rays through the light pipes.
Figure 10B:
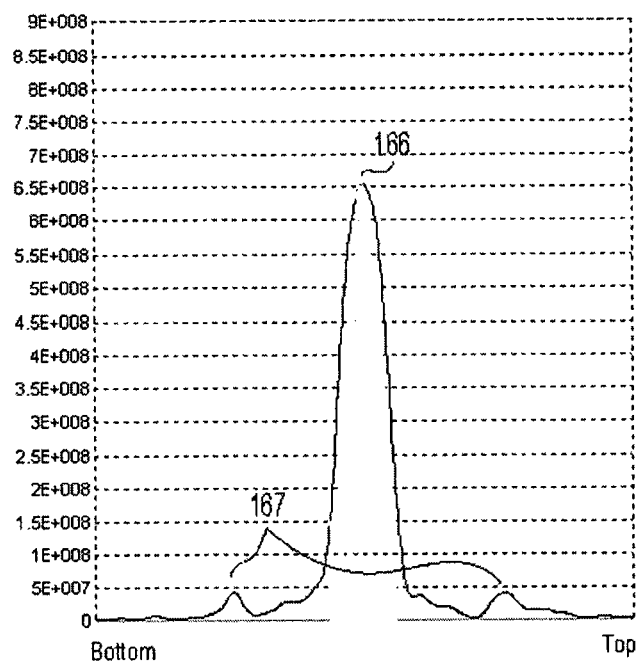
FIG. 10B is a longitudinal irradiance profile of the front surface of the status indicator lens corresponding to the conduction of light rays of FIG. 10A.

FIG. 10A is a side view of the light pipes 160 showing a plurality of light rays 165 shining from a single LED 138 below the center light pipe. FIG. 10B is a corresponding longitudinal irradiance profile of the front surface of the status indicator lens 128 taken along the X-axis as shown in FIG. 3A. The irradiance profile shows the hotspots (or pinpoints) of light produced on the front surface of the status indicator lens 128 in response to the light produced from the single center LED 138. As shown in FIG. 10A, the light from the center LED 138 also is transmitted to the front surface of the status indicator lens 128 by the adjacent light pipes 160. Accordingly, a center hotspot 166 and two adjacent hotspots 167 of lower intensities are produced on the front surface of the status indicator lens 128 as shown in FIG. 10B. A similar situation occurs when any one of the other four LEDs 138 are illuminated.

Preferably, only one pinpoint of illumination should be produced on the front surface of the status indicator lens in response to one LED 138 being illuminated. FIG. 11 is a right-side cross-sectional view of a dimmer switch 100' having light pipes 160' according to a second embodiment of the present invention. FIG. 12 is an enlarged right-side view of the light pipes 160', which comprise light-refracting structures 168'.

The light-refracting structures 168' operate to prevent the light rays 165 that are emitted by LEDs 138 located below adjacent light pipes 160' from reaching the front surface of the status indicator lens 128. The light rays emitted from each of the LEDs 138 are characterized by a "cone" of transmission having a half angle $\theta_L$, e.g., 60° (as shown in FIG. 12). When light rays emitted along the half angle $\theta_L$ contact the first end 161 of the light pipes 160', the light rays are refracted in towards the front surface of the status indicator lens 128. However, the light-refracting structures 168' have surfaces 169' that are positioned substantially perpendicular to these light rays from the adjacent LEDs 138, such that substantially all of the light from the adjacent LEDs passes through the surfaces 169' of the light-refracting structures 168'. The intensity of the light is attenuated after passing through the surfaces 169' of the light-refracting structures 168'. Accordingly, a minimum amount of the light emitted from LEDs 138 below adjacent light pipes 160' is reflected towards the front surface of the status indicator lens 128. The surfaces 169' of the light-refracting structures 168' are positioned at approximately an angle $\theta_R$ from the horizontal, which may be, for example, between 31° and 35°.

Figure 13A:
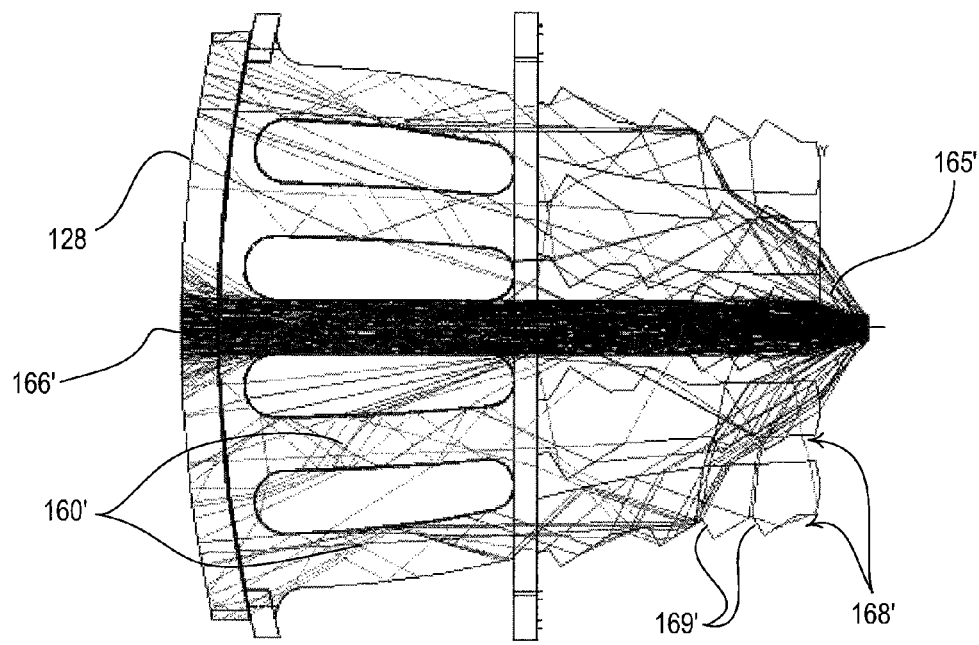
FIG. 13A is a side view of the light pipes of FIG. 12 demonstrating the conduction of light rays through the light pipes.
Figure 13B:
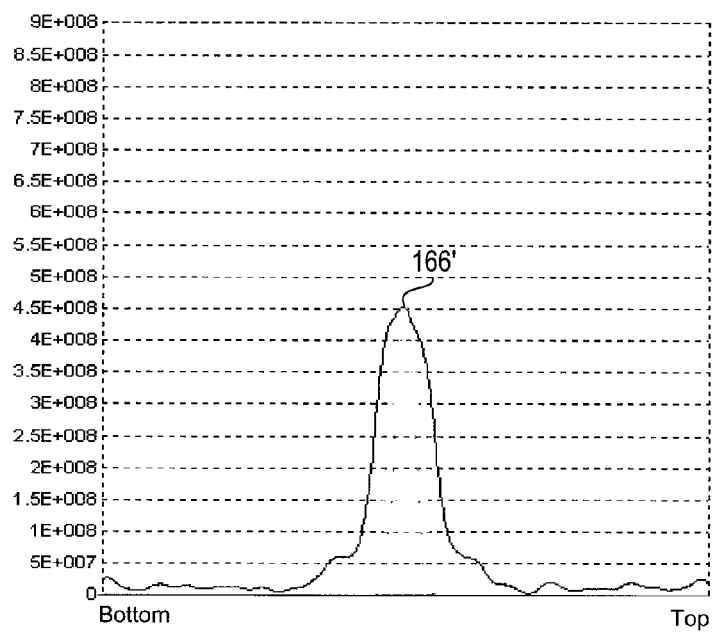
FIG. 13B is a longitudinal irradiance profile of the front surface of the status indicator lens corresponding to the conduction of light rays of FIG. 13A.

FIG. 13A is a side view of the light pipes 160' according to the second embodiment showing the light rays 165' shining from a single LED 138 below the center light pipe. FIG. 13B is a corresponding longitudinal irradiance profile of the front surface of the status indicator lens 128. As shown in FIG. 13A, more of the light rays 165' are dispersed away from the front surface of the status indicator lens 128 due to the surfaces 169' of the light-refracting structures 168'. Accordingly, the illuminated center LED 138 produces a single hotspot 166' on the front surface of the status indicator lens 128 as shown in FIG. 13B.

While the present invention has been described with reference to dimmer switches 100, 100', the concepts of the present invention could be applied to any type of load control device having a user interface provided in an opening of a traditional-style faceplate. For example, the dimmer switch 100 may comprise a fan speed control device or an electrical timer device, which is operable to turn off the connected electrical load after a predetermined amount of time after the electrical load is turned on. An electrical timer is described in greater detail in commonly-assigned co-pending U.S. patent application Ser. No. 11/521,234, filed Sep. 13, 2006, entitled WALL-MOUNTABLE TIMER FOR AN ELECTRICAL LOAD, the entire disclosure of which is hereby incorporated by reference.

Further, the dimmer switches 100, 100' could be included as part of a lighting control system. Therefore, the dimmer switches 100, 100' could also include a communication circuit to allow the dimmer switch 100 to transmit and receive digital messages on a communication link, e.g., a wired communication link, a power-line carrier (PLC) communication link, or a wireless communication link, such as a radio-frequency (RF) communication link or an infrared (IR) communication link. Examples of RF lighting control systems are described in greater detail in commonly-assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, and commonly-assigned U.S. Pat. No. 6,803,728, issued Oct. 12, 2004, entitled SYSTEM FOR CONTROL OF DEVICES. An example of a lighting control system having an IR communication link is described in greater detail in commonly-assigned U.S. Pat. No. 6,300,727, issued Oct. 9, 2001, entitled LIGHTING CONTROL WITH WIRELESS REMOTE CONTROL AND PROGRAMMABILITY. An example of a power-line carrier communication system using a current-carrier technique is described in greater detail in commonly-assigned U.S. patent application Ser. No. 11/447,431, filed Jun. 6, 2006, entitled SYSTEM FOR CONTROL OF LIGHTS AND MOTORS. The entire disclosures of all of the above-referenced patents and patent applications are hereby incorporated by reference.

Although the word "device" has been used to describe the elements of the dimmer of the present invention, it should be noted that each "device" described herein need not be fully contained in a single enclosure or structure. For example, a control actuator having the linear array of status indicators may be provided on a low-voltage wallstation that communicates (directly or indirectly) with a remotely located dimmer module in a separate location, such as a power panel.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A light pipe structure for conducting light from a plurality of discrete light sources, the light pipe structure comprising:

first and second light pipes, each having a first end adapted to be located adjacent respective first and second discrete light sources and a second end opposite the first end, each of the light pipes operable to conduct the light of the respective discrete light source from the respective first end to the respective second end;

a continuous lens having a front surface and a rear surface, the rear surface of the lens coupled to the second ends of the light pipes, such that the light conducted from the first discrete light source through the first light pipe generates a pinpoint of light on the front surface of the lens adjacent the second end of the first light pipe, the pinpoint of light surrounded by a diffusion of light across the front surface of the lens; and wherein the second light pipe comprises a light-refracting structure adapted to refract, in a direction away from the second end of the second light pipe, the light emitted from the first discrete light source that enters the second light pipe, so as to minimize the amount of light emitted from the first discrete light source that reaches the second end of the second light pipe.

2. The light pipe structure of claim 1, wherein the light-refracting structure comprises a light-refracting surface arranged substantially perpendicular to the light emitted from the first discrete light source that enters the second light pipe so as to maximize transmission of the light through the light-refracting surface.

3. The light pipe structure of claim 1, further comprising:

a plurality of rounds coupling the second end of the first light pipe to the rear surface of the lens to provide for the diffusion of light around the pinpoint of light on the front surface of the lens.

4. The light pipe structure of claim 1, wherein the lens is curved.

5. The light pipe structure of claim 1, wherein the continuous lens comprises a status indicator lens, and the light pipes are received in a control actuator of a load control device such that the status indicator lens is provided at a front surface of the control actuator.

6. A load control device for controlling the amount of power delivered to an electrical load from an AC power source, the load control device comprising:

a control actuator adapted to be provided in an opening of a faceplate;

a linear array of discrete light sources mounted inside the load control device;

a status indicator lens provided at a front surface of the actuator, the status indicator lens having a front surface and a rear surface; and a plurality of light pipes received within the control actuator, the light pipes operable to conduct the light from each of the plurality of discrete light sources to the status indicator lens at the front surface of the actuator, each of the light pipes having a first end adapted to be located adjacent one of the plurality of discrete light sources and a second end, each of the light pipes operable to conduct the light of one of the discrete light sources from the first end to the second end, the rear surface of the lens coupled to the second end of each of the light pipes;

wherein the status indicator lens is operable to display a representation of the amount of power being delivered to the electrical load by illuminating a point on the status indicator lens, the point surrounded by a diffusion of light across the status indicator lens; and wherein at least one light pipe comprises a light-refracting structure adapted to minimize the amount of the light emitted from the discrete light sources that are not located adjacent the first end of the at least one light pipe from reaching the second end of the at least one light pipe.

7. The load control device of claim 6, wherein the second ends of the light pipes are coupled to the rear surface of the status indicator lens via a plurality of rounds, the rounds providing for the diffusion of light around the pinpoint of light on the front surface of the status indicator lens.

8. The load control device of claim 6, wherein the light-refracting structure comprises a light-refracting surface arranged substantially perpendicular to the light emitted from the discrete light sources that are not located adjacent the first end of the at least one light pipe so as to refract the light through the light-refracting surface.

9. The load control device of claim 6, further comprising:
a controllably conductive device operable to be coupled in series electrical connection between the AC power source and the electrical load, the controllably conductive device having a control input for controlling the controllably conductive device between a non-conductive state and a conductive state; and
a controller operatively coupled to the control input of the controllably conductive device for controlling the controllably conductive device between the non-conductive state and the conductive state, the controller is operable to control the amount of power delivered to the electrical load in response to an actuation of the control actuator.

10. An illumination display for indicating the location of which of a plurality of spaced discrete radiation sources is turned on; said illumination display comprising:
a plurality of spaced elongated radiation conductors each having first and second end locations;
a continuous lens for producing a visual display when illuminated by radiation from said radiation sources;
a first end of each of said radiation conductors being disposed adjacent a respective one of said radiation sources;
a second end of each of said radiation conductors being disposed at a given lateral location along the length of said continuous lens whereby said continuous lens produces a visible point of light at a lateral location along the lens related to the position of any of the given discrete radiation sources when any of said any of the given discrete radiation sources is turned on,
further wherein at least one radiation conductor comprises a radiation-refracting structure adapted to minimize the amount of radiation emitted from the discrete radiation sources that are not located adjacent the first end location of the at least one radiation conductor from reaching the second end of the at least one radiation conductor.

11. The illumination display of claim 10, wherein said first ends of adjacent ones of said radiation conductors are arranged to receive radiation from respective adjacent illuminated radiation sources whereby radiation is diffused across at least a portion of the length of said continuous lens and surrounds a point of light at a location along the lens corresponding to the second end of said radiation conductor adjacent an illuminated radiation source.

12. The light pipe structure of claim 1, wherein the light-refracting structure includes a plurality of light-refracting surfaces arranged substantially perpendicular to the light that is emitted from the first discrete light source and enters the second light pipe at the first end to refract the light through the light-refracting surface.

13. The light pipe structure of claim 1, wherein the first light pipe comprises a light-refracting structure adapted to refract, in a direction away from the second end of the first light pipe, the light emitted from the second discrete light source that enters the first light pipe, so as to minimize the amount of light emitted from the second discrete light source that reaches the second end of the first light pipe.

14. The load control device of claim 6, wherein the light-refracting structure includes a plurality of light-refracting surfaces arranged substantially perpendicular to the light that is emitted from the discrete light sources that are not located adjacent the first end of the at least one light pipe to refract the light through the light-refracting surfaces.

15. The load control device of claim 6, wherein the light pipes each comprise a light-refracting structure, each of the light-refracting structures adapted to minimize the light emitted from the discrete light sources that are not located adjacent the first end of the respective light pipe from reaching the front surface of the lens.

16. A light pipe structure for conducting light from a plurality of discrete light sources, the light pipe structure comprising:
a first elongated light pipe having a first end adapted to be located adjacent a first discrete light source and a second end opposite the first end, the first elongated light pipe adapted to conduct light emitted from the first discrete light source from the first end to the second end; and
a second elongated light pipe arranged alongside the first elongated light pipe, the second elongated light pipe having a first end adapted to be located adjacent a second discrete light source and a second end opposite the first end, the second elongated light pipe adapted to conduct light emitted from the second discrete light source from the first end to the second end;
wherein the first and second elongated light pipes and the first and second discrete light sources are located such that at least some of the light emitted from the first light source illuminates the first end of the second elongated light pipe; and
wherein the second elongated light pipe further comprises a surface located near the first end and arranged substantially perpendicular to the light that is emitted from the first discrete light source and enters the second elongated light pipe at the first end, so as to transmit through the surface, in a direction away from the second end of the second elongated light pipe, the light that is emitted from the first discrete light source and enters the second elongated light pipe at the first end, to thus minimize the amount of light emitted from the first discrete light source that reaches the second end of the second elongated light pipe.

17. The light pipe structure of claim 16, wherein the first elongated light pipe further comprises a surface located near the first end and arranged substantially perpendicular to light that is emitted from the second discrete light source and enters the first elongated light pipe at the first end, so as to transmit through the surface, in a direction away from the second end of the first elongated light pipe, the light that is emitted from the second discrete light source and enters the first elongated light pipe at the first end, to thus minimize the amount of light emitted from the second discrete light source that reaches the second end of the first elongated light pipe.

* * * * *